United States Patent
Chen

(10) Patent No.: US 7,990,256 B2
(45) Date of Patent: Aug. 2, 2011

(54) AUTOMATIC WARNING AND BREAKING SYSTEM FOR VEHICLE

(75) Inventor: Ga-Lane Chen, Santa Clara, CA (US)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 411 days.

(21) Appl. No.: 12/261,300

(22) Filed: Oct. 30, 2008

(65) Prior Publication Data

US 2009/0278675 A1    Nov. 12, 2009

(30) Foreign Application Priority Data

May 6, 2008    (CN) .......................... 2008 1 0301418

(51) Int. Cl.
*G08B 21/00*    (2006.01)
(52) U.S. Cl. ....................................... 340/435; 340/438
(58) Field of Classification Search .................. 340/453, 340/435, 436, 438
See application file for complete search history.

(56) References Cited

U.S. PATENT DOCUMENTS

| 7,561,067 B2 * | 7/2009 | Matayoshi et al. ........... 340/973 |
| 2004/0022416 A1 * | 2/2004 | Lemelson et al. ............ 382/104 |

* cited by examiner

*Primary Examiner* — Jeffery Hofsass
(74) *Attorney, Agent, or Firm* — Andrew C. Cheng

(57) ABSTRACT

An automatic warning and breaking system for a vehicle, includes a plurality of cameras, a motion sensor, a data process unit, an alarm unit, a control unit and an adjustor unit. The cameras are for capturing images of objects inside and outside of the vehicle. The motion sensor unit includes at least an acceleration sensor and a gyro sensor, configured for sensing motion of the vehicle. The data process unit is electrically connected to the cameras and the motion sensor unit, configured for processing data from the respective cameras and the motion sensor unit. The alarm unit is connected to the data process unit, configured for giving a warning signal if a data processing result is unsafe. The control unit is configured for generating a control signal based on the warning signal. The adjustor unit is configured for adjusting a break unit of the vehicle based on the control signal.

6 Claims, 2 Drawing Sheets

AUTOMATIC WARNING AND BREAKING SYSTEM FOR VEHICLE

BACKGROUND

1. Technical Field

The present invention relates to an automatic warning and breaking system for a vehicle.

2. Description of Related Art

Vehicles, such as automobiles, have been widely used. Such vehicles bring convenience to people, but can also pose high risk, especially when the operator of a vehicle is under influence of intoxication or fatigue.

Many safety devices have been used in the vehicles, for example, seat belts and airbags. However, such safety devices only protect people when an accident happens, but cannot avoid the accident.

In addition, a plurality of cameras have been mounted on the vehicle to help the driver to monitor the vehicle distance from others on the road. Data of the cameras are displayed on a display provided in front of the driver. However, the driver is still required to carefully watch the display at all time and act accordingly, which is inconvenient.

What is needed, therefore, is an automatic warning and breaking system for a vehicle to overcome the above shortcomings.

SUMMARY

An automatic warning and breaking system for a vehicle, includes a plurality of cameras, a motion sensor, a data process unit, an alarm unit, a control unit, a break unit and an adjustor unit. The cameras are for capturing images of objects inside and outside of the vehicle. The motion sensor unit includes at least an acceleration sensor and a gyro sensor, configured for sensing motion of the vehicle. The data process unit is electrically connected to the cameras and the motion sensor unit, configured for processing data from the respective cameras and the motion sensor unit. The alarm unit is connected to the data process unit, configured for generating a warning signal for the driver of the vehicle if the data process unit detects unsafe driving conditions. The control unit is configured for generating a control signal based on the warning signal. The adjustor unit is connected to the break unit and configured for applying an adjusting force on the break unit based on the control signal of the control unit.

Other advantages and novel features of the present automatic warning and breaking system will become more apparent from the following detailed description of embodiment when taken in conjunction with the accompanying drawings.

BRIEF DESCRIPTION OF THE DRAWINGS

Many aspects of the automatic warning and breaking system can be better understood with reference to the following drawings. The components in the drawings are not necessarily drawn to scale, the emphasis instead being placed upon clearly illustrating the principles of the present automatic warning and breaking system. Moreover, in the drawings, like reference numerals designate corresponding parts throughout the several views.

DETAILED DESCRIPTION OF THE EMBODIMENTS

Embodiments of the present automatic warning and breaking system will now be described in detail below and with reference to the drawings.

Figure 1:
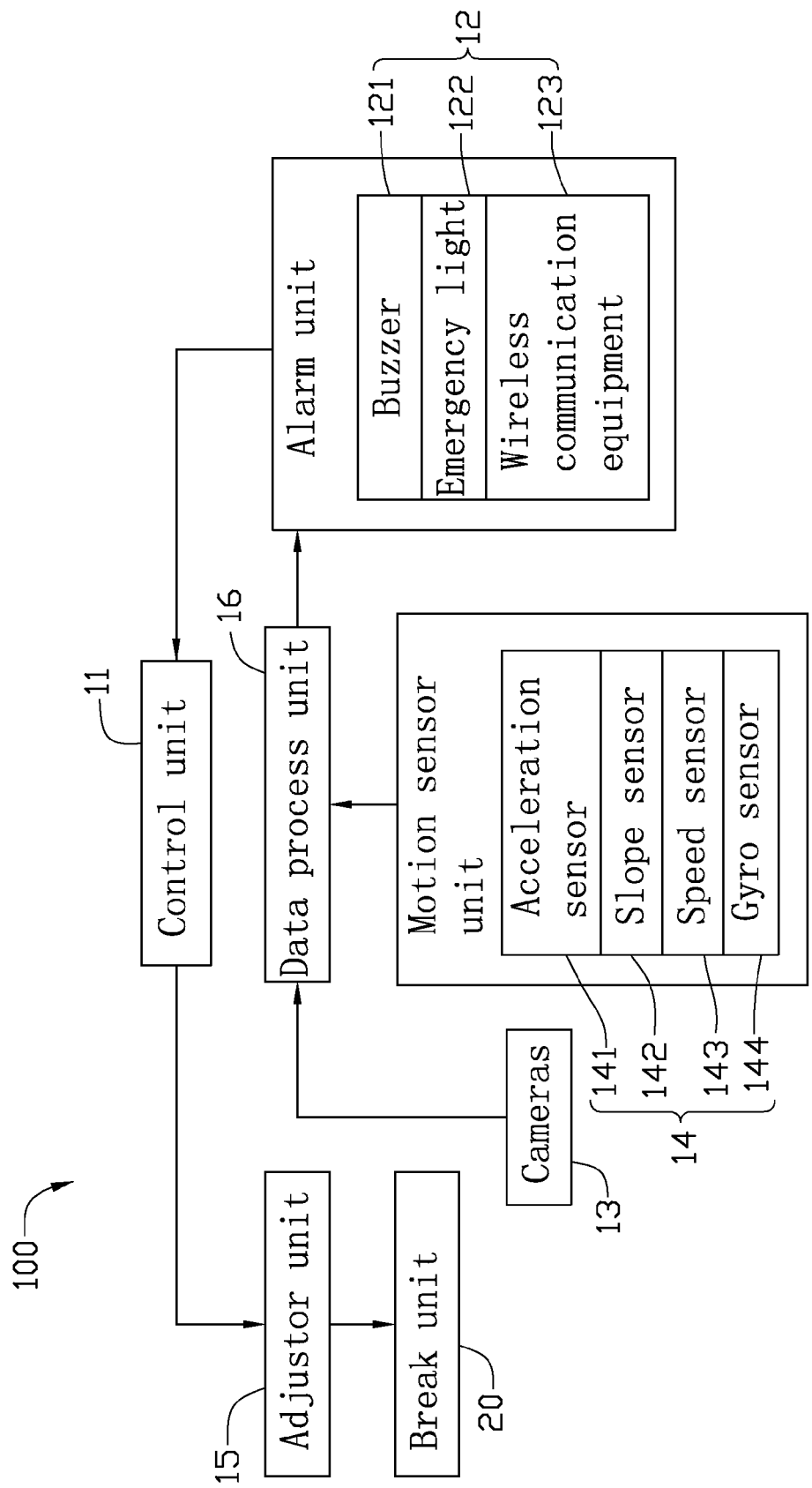
FIG. 1 is a block diagram showing an automatic warning and breaking system for a vehicle in accordance with an exemplary embodiment.

Referring to FIG. 1, an automatic warning and breaking system 100 for a vehicle, is provided. The automatic warning and breaking system 100 includes a plurality of cameras 13, a motion sensor unit 14, a data process unit 16, an alarm unit 12, a control unit 11, a break unit 20 and an adjustor unit 15. The break unit 20 may be an ordinary break unit. The adjustor unit 15 is connected to the break unit 20.

The plurality of cameras 13 may be mounted inside and outside of the vehicle. Each of the cameras 13 may have an IR-pass filter with wavelength in a range from 750 nm to 1200 nm, preferably in a range from 850 nm to 1000 nm, such that the cameras 13 can capture images of objects in the dark.

The motion sensor unit 14 includes an acceleration sensor 141, a slope sensor 142, a speed sensor 143 and a gyro sensor 144.

Figure 2:
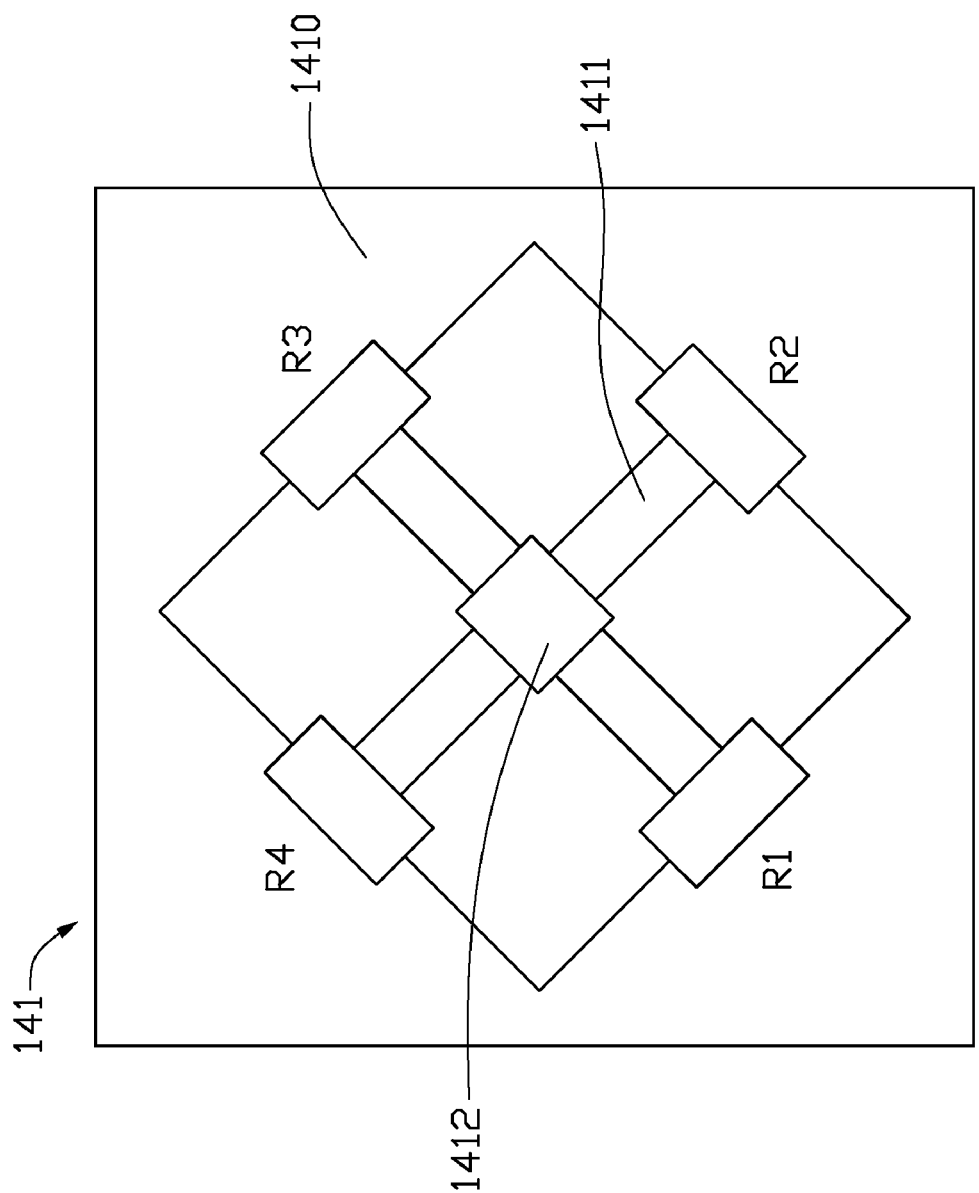
FIG. 2 is a plan view showing a acceleration sensor in the automatic warning and breaking system of FIG. 1.

Referring to FIG. 2, the acceleration sensor 141 includes a substrate 1410, a mass 1412 and four resistors R1, R2, R3 and R4. The four resistors R1-R4 are connected to the mass 1412 by four cantilever beams 1411, thus the mass 1412 and the four resistors R1-R4 are arranged in a diaphragm on the substrate 1410. The four resistors R1-R4 are connected to each other to form a Wheatstone bridge. All of the resistors R1-R4 may be piezoelectric resistors. Alternatively, two of the resistors R1-R4 may be piezoelectric resistors, one of the others is an adjustable resistor, and the last one may be a constant resistor. When an acceleration force is applied on the mass 1412, the four cantilever beams 1411 will conduct the acceleration force to the four resistors R1-R4, and the piezoelectric resistors will change their resistances according to the acceleration force. Acceleration of the vehicle can be calculated in accordance with the resistance change of the Wheatstone bridge.

The gyro sensor 144 is configured for detecting an angular velocity of the vehicle. The acceleration sensor 141 and the gyro sensor 144 are used for sensing a road condition. Cooperation of the acceleration sensor 141, slope sensor 142, speed sensor 143 and gyro sensor 144 can fully sense motion of the vehicle on the road.

The cameras 13 and the motion sensor unit 14 are electrically connected to the data process unit 16. The data process unit 16 is configured for processing data from the respective cameras 13 and the motion sensor unit 14. Preferably, a display (not shown) is provided to show the data processing results. The display may be positioned in front of the diver of the vehicle.

The alarm unit 12 is connected to the data process unit 16. The alarm unit 12 includes buzzer 121, an emergency light 122 and a wireless communication equipment 123. The alarm unit 12 is configured for generating a warning signal if a data processing result of the data process unit 16 is unsafe for the driving of the vehicle, for example, the vehicle is too close to a neighboring vehicle, or the motion velocity of the vehicle is not in a safe range. The warning signal can warn the driver of the vehicle. The alarm unit 12 can also send a wireless signal to predetermined locations such as hospitals and police stations if necessary.

The control unit 11 is configured for generating a control signal for the adjustor unit 15 based on the warning signal. The adjustor unit 15 may be a motor, and is able to apply an adjusting force on the break unit 20 of the vehicle based on the control signal. In this way, the adjustor unit 15 can help the driver to control the vehicle. The automatic warning and breaking system provides an active safety system for the vehicle.

It is understood that the above-described embodiments are intended to illustrate rather than limit the invention. Variations may be made to the embodiments and methods without departing from the spirit of the invention. Accordingly, it is appropriate that the appended claims be construed broadly and in a manner consistent with the scope of the invention.

What is claimed is:

1. An automatic warning and breaking system for a vehicle, comprising:
   a plurality of cameras for capturing images of objects inside and outside of the vehicle;
   a motion sensor unit comprising at least an acceleration sensor and a gyro sensor, configured for sensing motion of the vehicle, the acceleration sensor comprising a substrate, a mass and four resistors, the mass and the four resistors being arranged in a diaphragm on the substrate, at least two of the four resistors being piezoelectric resistors, and the four resistors being connected to each other to form a Wheatstone bridge;
   a data process unit, electrically connected to the cameras and the motion sensor unit, configured for processing data from the respective cameras and the motion sensor unit;
   an alarm unit, connected to the data process unit, configured for generating a warning signal for the driver of the vehicle if the data process unit detects unsafe driving conditions;
   a control unit configured for generating a control signal based on the warning signal;
   a break unit; and
   an adjustor unit, connected to the break unit, configured for applying an adjusting force on the break unit based on the control signal of the control unit.

2. The system of claim 1, further comprising a display for displaying data processing result by the data process unit.

3. The system of claim 1, wherein each of the cameras has an IR-pass filter with wavelength in a range from 850 nm to 1000 nm.

4. The system of claim 1, wherein all of the four resistors are piezoelectric resistors.

5. The system of claim 1, wherein two of the four resistors are piezoelectric resistors; one of the other two resistors is an adjustable resistor, and the other one is a constant resistor.

6. The system of claim 1, wherein the alarm unit comprises a buzzer, an emergency light and a wireless communication equipment.

* * * * *